United States Patent
Jacobs et al.

(10) Patent No.: US 8,607,020 B2
(45) Date of Patent: Dec. 10, 2013

(54) SHARED MEMORY PARTITION DATA PROCESSING SYSTEM WITH HYPERVISOR MANAGED PAGING

(75) Inventors: Stuart Z. Jacobs, Lakeville, MN (US);
Andrew T. Koch, Rochester, MN (US);
David A. Larson, Rochester, MN (US);
Kyle A. Lucke, Oronoco, MN (US);
Wade B. Ouren, Rochester, MN (US);
Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/403,459

(22) Filed: Mar. 13, 2009

(65) Prior Publication Data

US 2009/0307445 A1    Dec. 10, 2009

Related U.S. Application Data

(60) Provisional application No. 61/059,492, filed on Jun. 6, 2008.

(51) Int. Cl.
*G06F 12/00* (2006.01)

(52) U.S. Cl.
USPC ............ 711/173; 711/170; 711/202; 711/203

(58) Field of Classification Search
None
See application file for complete search history.

(56) References Cited

U.S. PATENT DOCUMENTS

| | | | |
|---|---|---|---|
| 5,588,135 A * | 12/1996 | Tanaka | 711/160 |
| 5,909,540 A | 6/1999 | Carter et al. | |
| RE36,462 E | 12/1999 | Chang et al. | |
| 6,725,284 B2 * | 4/2004 | Arndt | 710/5 |
| 6,769,017 B1 | 7/2004 | Bhat et al. | |
| 6,976,137 B2 | 12/2005 | Ouren et al. | |
| 7,080,146 B2 | 7/2006 | Bradford et al. | |
| 7,234,139 B1 | 6/2007 | Feinberg | |
| 7,506,095 B2 | 3/2009 | Otte et al. | |
| 7,680,754 B2 | 3/2010 | Hillier | |
| 7,698,531 B2 | 4/2010 | Flemming et al. | |
| 7,702,843 B1 | 4/2010 | Chen et al. | |
| 7,849,347 B2 | 12/2010 | Armstrong et al. | |

(Continued)

OTHER PUBLICATIONS

Office Action for U.S. Appl. No. 12/403,408 (Application No. US-2009-0307436-A1) dated Jul. 15, 2011.

(Continued)

*Primary Examiner* — Matthew Bradley
*Assistant Examiner* — Alan Otto
(74) *Attorney, Agent, or Firm* — Heslin Rothenberg Farley & Mesiti, P.C.

(57) ABSTRACT

Hypervisor managed memory paging is provided in a data processing system having multiple logical partitions. The data processing system includes a shared memory pool defined within physical memory. The shared memory pool includes a volume of physical memory with dynamically adjustable sub-volumes or sets of physical pages associated with the multiple logical partitions. Each sub-volume or set is associated with a particular logical partition and includes mapped logical memory pages for that logical partition. A hypervisor memory manager interfaces the multiple logical partitions and the shared memory pool, and manages access to logical memory pages within the shared memory pool. The hypervisor memory manager further manages page-out and page-in of logical memory pages from the shared memory pool to one or more external paging devices. This page-out and page-in managing by the hypervisor memory manager is transparent to the multiple logical partitions.

20 Claims, 10 Drawing Sheets

(56) References Cited

U.S. PATENT DOCUMENTS

| | | | |
|---|---|---|---|
| 2002/0010844 A1 | 1/2002 | Noel et al. | |
| 2002/0016812 A1* | 2/2002 | Uchishiba et al. | 709/104 |
| 2002/0087611 A1 | 7/2002 | Tanaka et al. | |
| 2002/0138704 A1 | 9/2002 | Hiser et al. | |
| 2003/0084372 A1 | 5/2003 | Mock et al. | |
| 2004/0139287 A1 | 7/2004 | Foster et al. | |
| 2004/0193861 A1 | 9/2004 | Michaelis | |
| 2004/0199599 A1 | 10/2004 | Nichols et al. | |
| 2005/0071446 A1 | 3/2005 | Graham et al. | |
| 2005/0160151 A1 | 7/2005 | Rawson, III | |
| 2005/0240932 A1 | 10/2005 | Billau et al. | |
| 2005/0278719 A1 | 12/2005 | Togawa | |
| 2006/0075207 A1 | 4/2006 | Togawa et al. | |
| 2006/0101224 A1 | 5/2006 | Shah et al. | |
| 2006/0123217 A1 | 6/2006 | Burdick et al. | |
| 2006/0146057 A1 | 7/2006 | Blythe | |
| 2006/0236059 A1 | 10/2006 | Fleming et al. | |
| 2007/0061441 A1 | 3/2007 | Landis et al. | |
| 2007/0112999 A1 | 5/2007 | Oney et al. | |
| 2007/0168635 A1 | 7/2007 | Allen et al. | |
| 2007/0210650 A1 | 9/2007 | Togashi | |
| 2007/0299990 A1 | 12/2007 | Ben-Yehuda et al. | |
| 2008/0040565 A1 | 2/2008 | Rozas et al. | |
| 2008/0071755 A1 | 3/2008 | Barsness et al. | |
| 2008/0082696 A1 | 4/2008 | Bestler | |
| 2008/0082975 A1 | 4/2008 | Oney et al. | |
| 2008/0183996 A1 | 7/2008 | Field et al. | |
| 2008/0256321 A1 | 10/2008 | Armstrong et al. | |
| 2008/0256327 A1 | 10/2008 | Jacobs et al. | |
| 2008/0256530 A1 | 10/2008 | Armstrong et al. | |
| 2008/0270674 A1* | 10/2008 | Ginzton | 711/6 |
| 2009/0100237 A1 | 4/2009 | Orikasa et al. | |
| 2009/0144510 A1 | 6/2009 | Wibling et al. | |
| 2009/0307436 A1 | 12/2009 | Larson et al. | |
| 2009/0307438 A1 | 12/2009 | Logan et al. | |
| 2009/0307439 A1 | 12/2009 | Jacobs et al. | |
| 2009/0307440 A1 | 12/2009 | Jacobs et al. | |
| 2009/0307441 A1 | 12/2009 | Hepkin et al. | |
| 2009/0307447 A1 | 12/2009 | Jacobs et al. | |
| 2009/0307688 A1 | 12/2009 | Pafumi et al. | |
| 2009/0307690 A1 | 12/2009 | Logan et al. | |
| 2009/0307713 A1 | 12/2009 | Anderson et al. | |
| 2010/0079302 A1 | 4/2010 | Eide et al. | |
| 2010/0083252 A1 | 4/2010 | Eide et al. | |

OTHER PUBLICATIONS

Office Action for U.S. Appl. No. 12/403,472 (U.S. Application Publication No. 2009-0307441 A1) dated Sep. 22, 2011.
Jacob Faber Kloster et al. "Efficient Memory Sharing in the Xen Virtual Machine Monitor." Jan. 2006. Department of Computer Science, Aalborg University.
Carl A. Waldspurger. "Memory Resource Management in VMware ESX Server." Dec. 2002. ACM. OSDI '02.
Office Action for U.S. Appl. No. 12/403,447 (U.S. Patent Publication No. 2009/0307440 A1), dated May 11, 2011.
Office Action for U.S. Appl. No. 12/403,472 (U.S. Patent Publication No. 2009/0307441 A1), dated Sep. 22, 2011.
Kloster, Jacob Faber et al. "Efficient Memory Sharing in the Xen Virtual Machine Monitor", Department of Computer Science, Aalborg University (Jan. 2006).
Waldspurger, Carl A., "Memory Resource Management in VMware ESX Server." ACM, OSDI '02, (Dec. 2002).
Notice of Allowance for U.S. Appl. No. 12/403,447 (U.S. Patent Publication No. 2009/0307440 A1), dated Oct. 18, 2011.
Office Action for U.S. Appl. No. 12/403,440 (U.S. Patent Publication No. 2009/0307439 A1), dated Oct. 27, 2011.
Office Action for U.S. Appl. No. 12/403,402 (U.S. Patent Publication No. 2009/0307713 A1), dated Nov. 30, 2011.
IBM International Technical Support Organization, "HiperSockets Implementation Guide", pp. 1-132 (Mar. 2007).
Valdez, E. et al., "Retrofitting the IBM POWER Hypervisor to Support Mandatory Access Control", 23rd Annual Computer Security Applications Conference (pp. 221-230) (2007).
Notice of Allowance for U.S. Appl. No. 12/403,426 (U.S. Patent Publication No. 2009/0307438 A1) dated Nov. 7, 2011.
Final Office Action for U.S. Appl. No. 12/403,485 (U.S. Patent Publication No. 20090307447) dated Oct. 7, 2011.
Office Action for U.S. Appl. No. 12/403,485 (U.S. Patent Publication No. 2009/0307447 A1), dated Apr. 28, 2011.
Logan et al., Office Action dated Jul. 16, 2012, for U.S. Appl. No. 13/447,393, filed Apr. 16, 2012.
Logan et al., Office Action for U.S. Appl. No. 13/369,575, filed Feb. 9, 2012, dated Mar. 12, 2012.
Jacobs et al., Office Action for U.S. Appl. No. 13/344,721, filed Jan. 6, 2012, dated Mar. 20, 2012.
Jacobs et al., Office Action for U.S. Appl. No. 13/344,708, filed Jan. 6, 2012, dated Mar. 27, 2012.
Logan et al., Office Action for U.S. Appl. No. 12/403,416, filed Mar. 13, 2009 (US Patent Publication No. 2009/0307690 A1), dated Mar. 30, 2012.
Jacobs et al., Final Office Action for U.S. Appl. No. 12/403,440, filed Mar. 13, 2009 (US Patent Publication No. 2009/0307439 A1) dated Apr. 6, 2012.
Larson et al., Office Action for U.S. Appl. No. 13/362,402, filed Jan. 31, 2012, dated Apr. 11, 2012.
Logan et al., Notice of Allowance for U.S. Appl. No. 13/447,393, filed Apr. 16, 2012 (U.S. Patent Publication No. 2012/0204174 A1), dated Dec. 28, 2012.
Logan et al., Office Action for U.S. Appl. No. 13/536,175, filed Jun. 28, 2012 (U.S. Patent Publication No. 2012/0266173 A1), dated Dec. 28, 2012.
Jacobs et al., Notice of Allowance for U.S. Appl. No. 13/344,708, filed Jan. 6, 2012, dated Jul. 19, 2012.
Jacobs et al., Notice of Allowance for U.S. Appl. No. 13/344,721, filed Jan. 6, 2012, dated Jul. 19, 2012.
Jacobs et al., Office Action for U.S. Appl. No. 13/586,420, filed Aug. 15, 2012 (U.S. Patent Publication No. 2011/0311274 A1), dated Apr. 17, 2013.
Logan et al., Notice of Allowance for U.S. Appl. No. 13/536,175, filed Jun. 28, 2013 (U.S. Patent Publication No. 2012/0266173 A1), dated May 23, 2013 (pp. 1-14).

* cited by examiner

SHARED MEMORY PARTITION DATA PROCESSING SYSTEM WITH HYPERVISOR MANAGED PAGING

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to memory paging in the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, then once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in the server that is shared by other shared memory partitions on that server. The amount of physical memory in the pool is typically smaller than the sum of the logical memory assigned to all of the shared memory partitions using the pool to allow the memory to be more fully utilized. Idle and/or less active logical memory in the shared memory partitions that does not fit in the physical shared memory pool is paged out by the hypervisor to a cheaper and more abundant form of storage via an entity external to the hypervisor known as a paging service partition, which is one implementation of a VIOS partition.

Provided herein, in one aspect, is a method of managing memory paging in a data processing system including multiple logical partitions. The method includes: defining a shared memory pool within physical memory of the data processing system, the shared memory pool comprising a volume of physical memory with dynamically adjustable sub-volumes associated with different logical partitions of the multiple logical partitions, and including logical memory pages thereof mapped to physical memory; interfacing the multiple logical partitions and the shared memory pool via a hypervisor memory manager, the hypervisor memory manager managing access to logical memory pages within the shared memory pool; and managing by the hypervisor memory manager page-out of logical memory pages from the shared memory pool to one or more external paging devices and page-in of logical memory pages from the one or more external paging devices to the shared memory pool, wherein the page-out and the page-in of logical memory pages by the hypervisor memory manager are transparent to the multiple logical partitions.

In another aspect, a logically partitioned data processing system is provided which includes a shared memory pool and a hypervisor memory manager. The shared memory pool is defined within physical memory of the data processing system, and includes a volume of physical memory with dynamically adjustable sub-volumes or sets of physical pages associated with different logical partitions of the multiple logical partitions, and including logical memory pages thereof mapped to physical memory. The hypervisor memory manager interfaces the multiple logical partitions in the shared memory pool, and manages access to logical memory pages of the multiple logical partitions. The hypervisor memory manager further manages page-out of logical memory pages of the shared memory pool to one or more external paging devices and page-in of logical memory pages from the one or more external paging devices to the shared memory pool. The page-out and the page-in by the hypervisor memory manager are transparent to the multiple logical partitions.

In a further aspect, an article of manufacture is provided which includes at least one computer-readable medium having computer-readable program code logic to manage memory paging in a data processing system comprising multiple logical partitions. The computer-readable program code logic when executing on a processor performs: defining a shared memory pool within physical memory of the data processing system, the shared memory pool comprising a volume of physical memory with dynamically adjustable sub-volumes associated with different logical partitions of the multiple logical partitions, and including logical memory pages thereof mapped to physical memory; interfacing the multiple logical partitions and the shared memory pool via a hypervisor memory manager, the hypervisor memory manager managing access to logical memory pages within the shared memory pool; and managing by the hypervisor memory manager page-out of logical memory pages from the shared memory pool to one or more external paging devices and page-in of logical memory pages from the one or more external paging devices to the shared memory pool, wherein the page-out and the page-in by the hypervisor memory manager are transparent the multiple logical pages.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
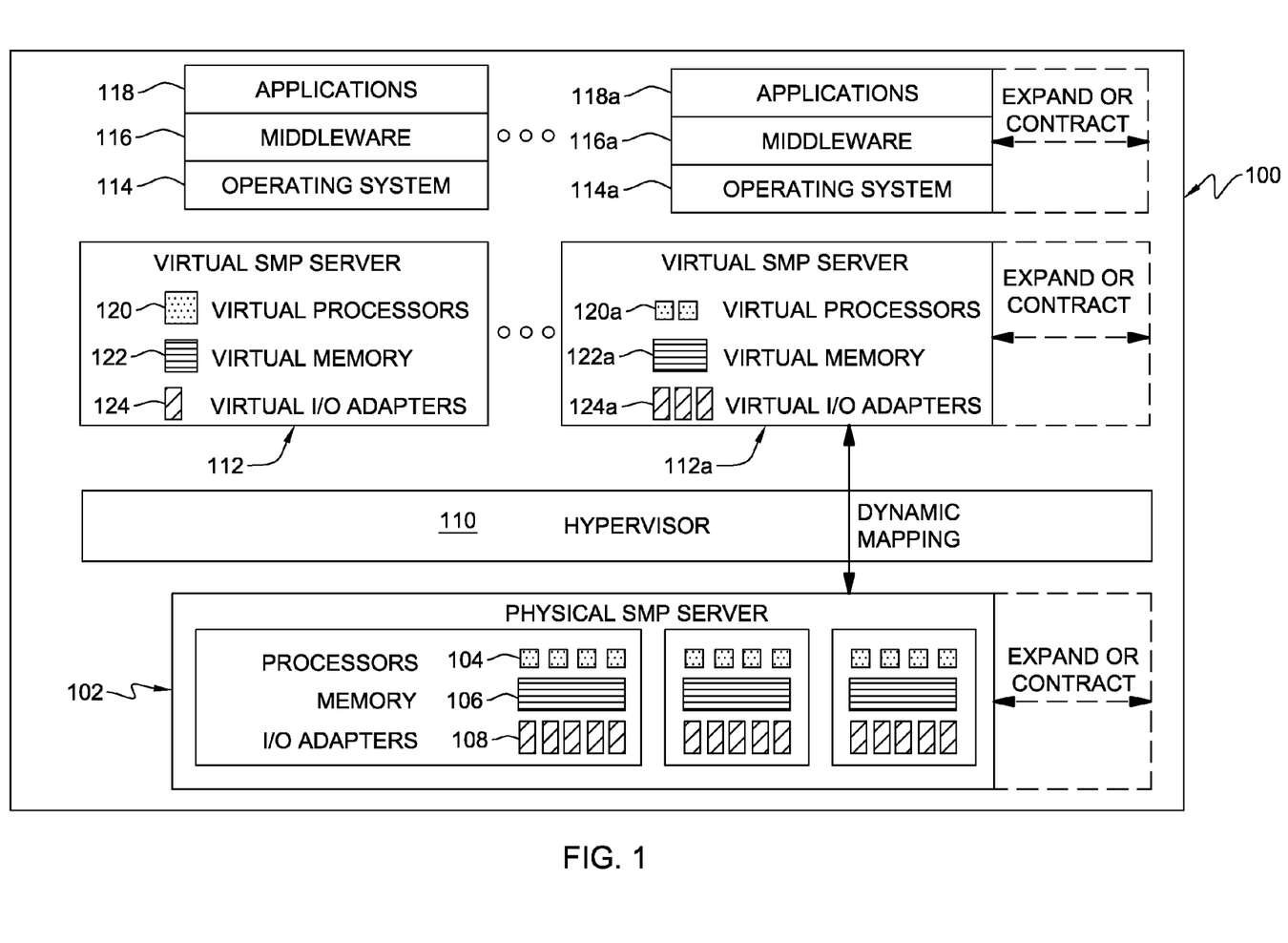
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
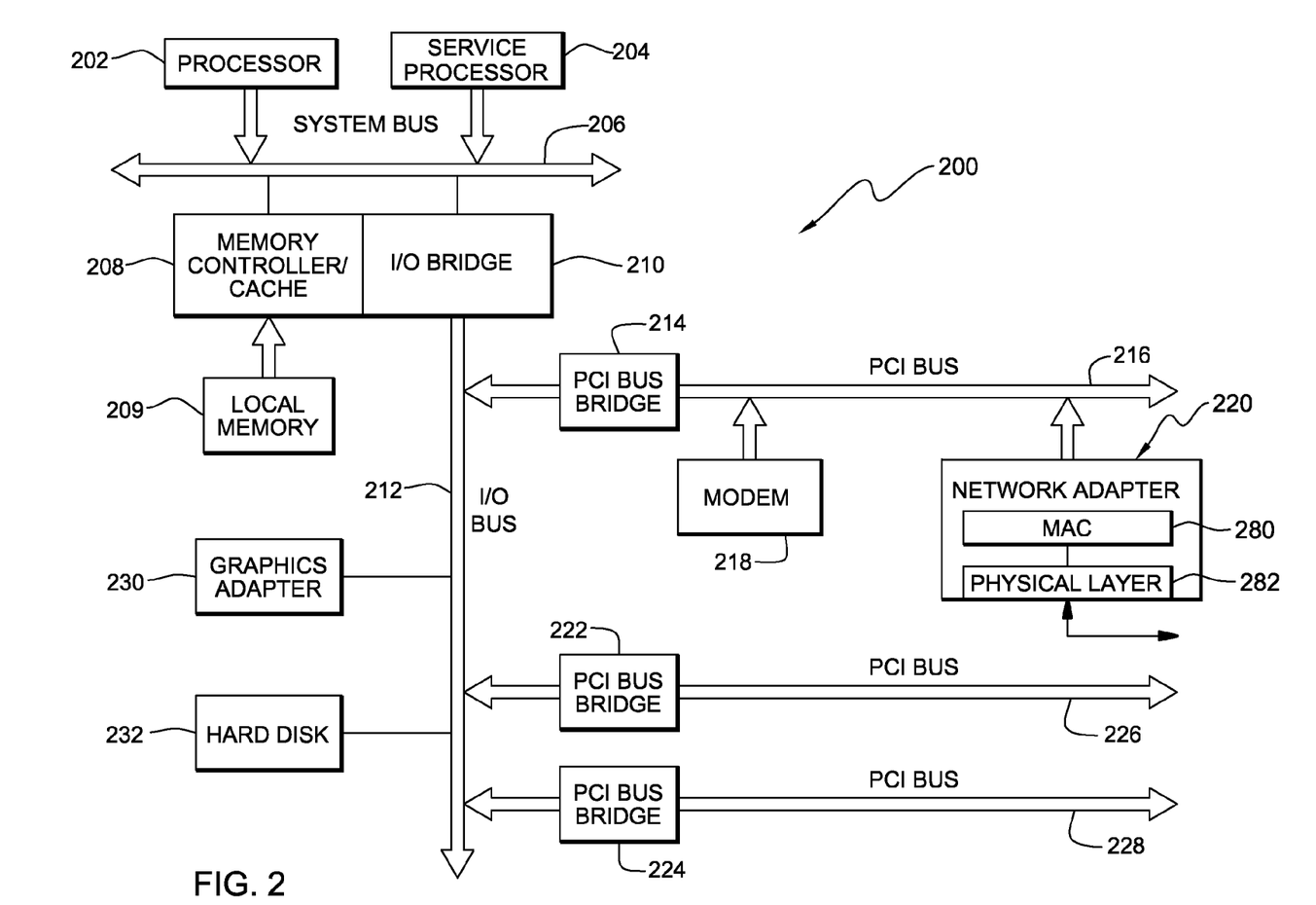
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
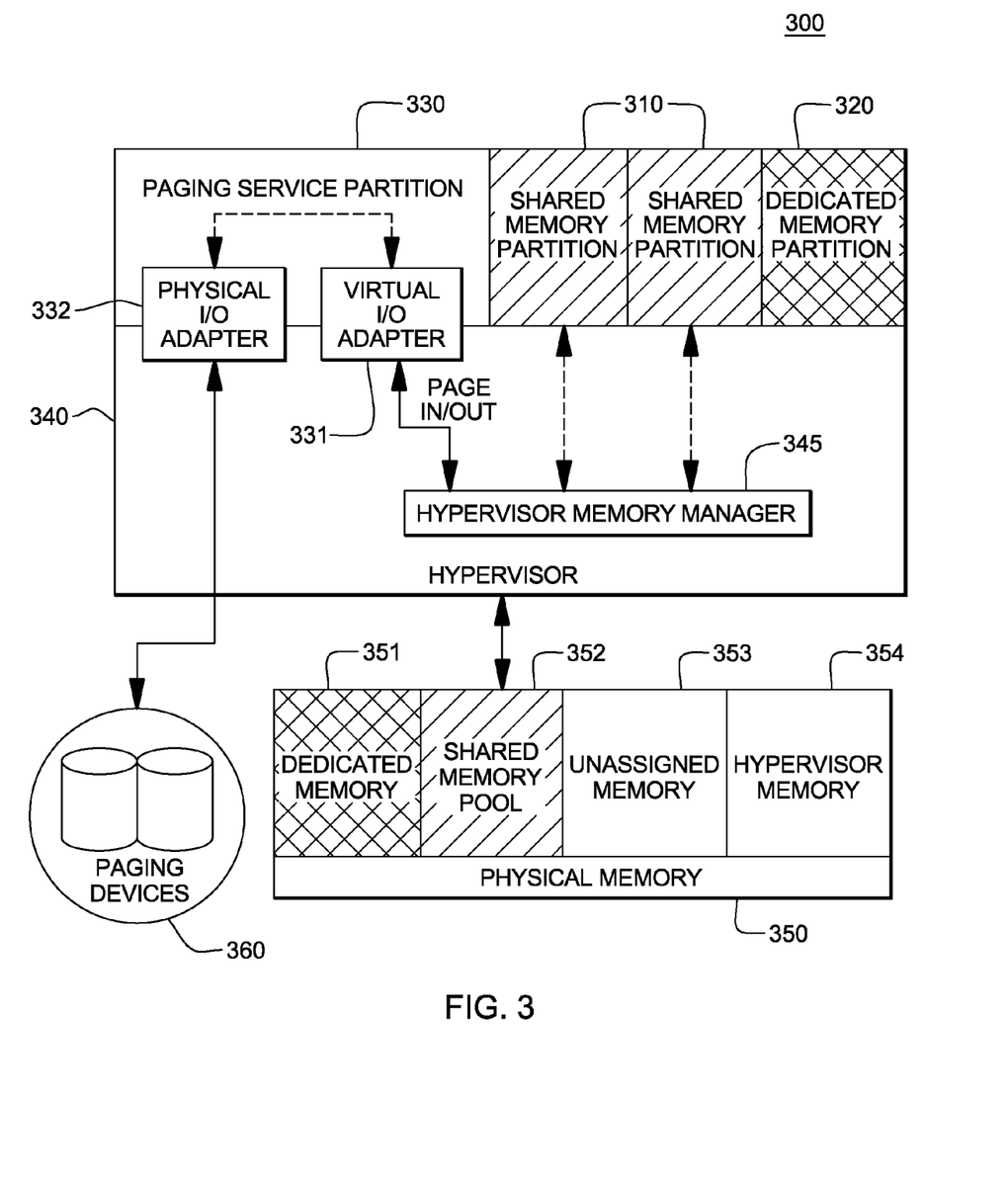
FIG. 3 illustrates one embodiment of a data processing system comprising multiple shared memory partitions employing a shared (or common) memory pool defined within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, shared memory partition data processing system 300 includes (in one embodiment) one or more shared memory partitions 310, each of which comprises one or more virtual processors, which interface through a hypervisor 340, and more particularly, a hypervisor memory manager 345, to a shared memory pool 352 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 352 is paged out by the hypervisor to a more abundant, less expensive storage (such as disk storage), via a paging service partition 330. Paging service partition 330 is an enhanced virtual input/output service (VIOS) partition configured to facilitate page-out and page-in of logical memory pages from or to, respectively, the shared memory pool. Paging-out and paging-in of logical memory pages is via a virtual input/output adapter 331 interfacing hypervisor memory manager 345 and paging service partition 330, and a physical input/output adapter 332 interfacing paging service partition 330 and external storage (i.e., external paging devices) 360.

For completeness, also shown in FIG. 3 is a dedicated memory partition 320 which employs dedicated memory 351 within physical memory 350. Physical memory 350 further includes unassigned memory 353 and hypervisor memory 354. The volume of memory within shared memory pool 352 may be dynamically allocated between the shared memory partitions 310 into sub-volumes or sets of physical pages to accommodate workloads. These dynamically allocated (or dynamically adjusted) sub-volumes or sets of physical pages in the shared memory pool are associated with the multiple logical partitions and may comprise contiguous or disparate physical memory locations within the shared memory pool. A physical memory page of the shared memory pool becomes part of a sub-volume of a particular logical partition when a logical memory page thereof is associated with or mapped to that physical page. Also, although referred to as a shared memory pool, in reality, there is no concurrent sharing of access to a physical page per se, but rather a sharing of the set amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output adapter connection to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by the shared memory partition and it does not have a physical mapping in the shared memory pool, the hypervisor treats this request to access as an internal fault (i.e., a hypervisor page fault). In response to a hypervisor page fault for a logical memory page that is not resident in the shared memory pool, an I/O paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of the virtual processor until the I/O paging request is satisfied, or if the hypervisor page fault occurred while external interrupts were enabled for the virtual processor, until an external or timer interrupt occurs. The I/O paging request is submitted to the virtual I/O adapter of the paging service partition, which communicates with the paging service partition in order to retrieve and return the correct contents of the logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
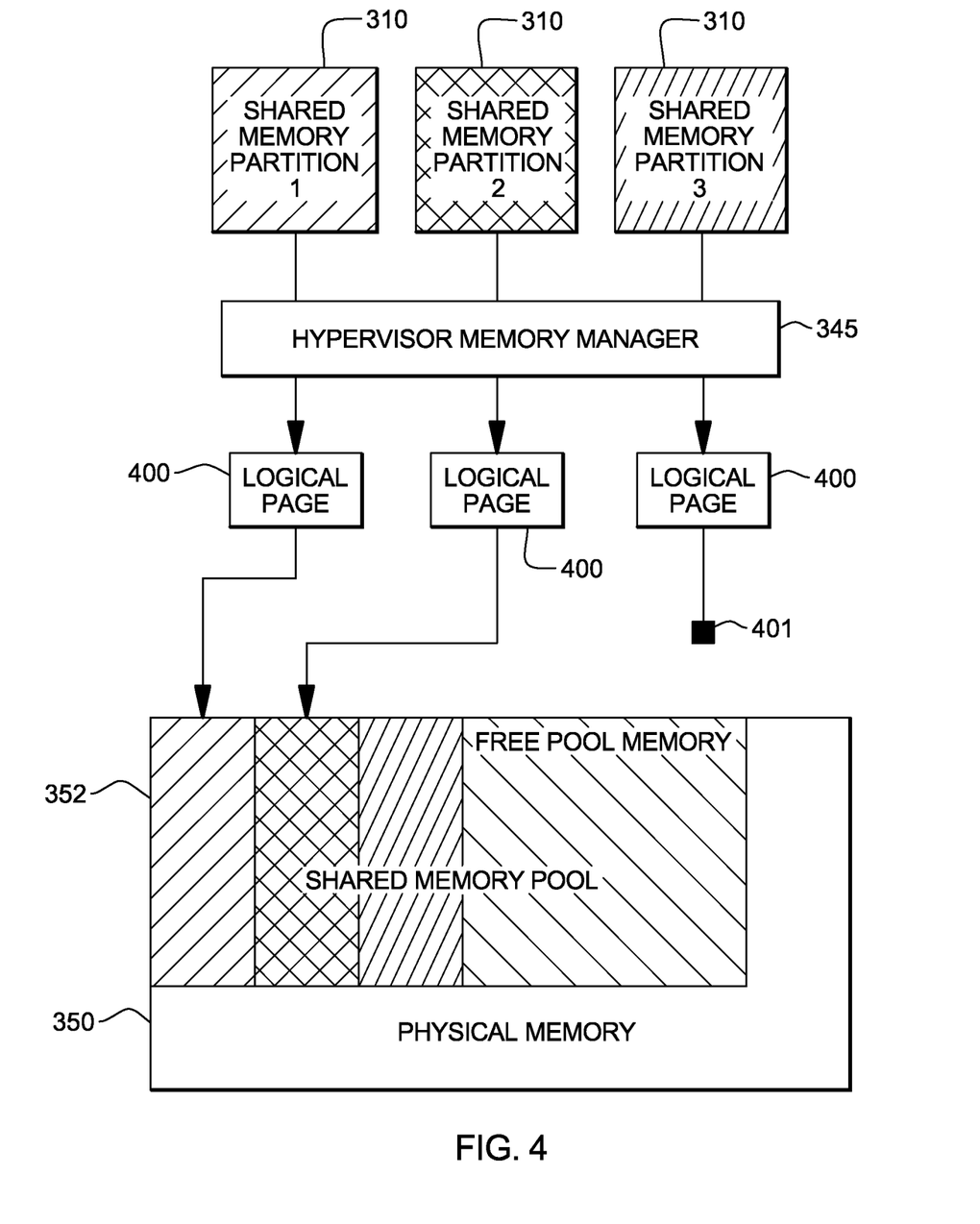
FIG. 4 illustrates one embodiment of a shared memory partition data processing system, wherein a request for a logical page results in a hypervisor page fault to be handled, in accordance with an aspect of the present invention.

FIG. 4 illustrates one example of a hypervisor page fault. The shared memory data processing system illustrated includes shared memory partitions 310, a hypervisor memory manager 345 and physical memory 350, which includes shared memory pool 352, such as described above in connection with FIG. 3. In this example, shared memory partition 1 requests a logical page 400 (via hypervisor memory manager 345), which can be satisfied from shared memory pool 352. Shared memory partitions have a range of logical memory pages. Each logical memory page may or may not currently have a physical memory page assigned to it within the shared memory pool. This assignment is referred to as page mapping. The hypervisor memory manager manages the page mappings for the shared memory partitions within the data processing system that are assigned to the shared memory pool. This management is transparent to the shared memory partitions 310, and the hypervisor memory manager performs paging I/O operations through one or more virtual I/O adapters and the paging service partition without the knowledge or intervention of the shared memory partitions (or shared memory partition threads) requesting the logical memory pages. The complete memory contents for a shared memory partition are stored on external storage (i.e., the external paging devices) and accessed through the virtual I/O connection between the hypervisor memory manager and the paging service partition. Each shared memory partition is assigned a stream (or partition service) in the virtual I/O connection. This stream (or partition service) is used to identify which external storage device is being used for the particular shared memory partition requesting a logical memory page which is absent from the shared memory pool.

In the example of FIG. 4, shared memory partition 2 also requests a logical page 400, which is mapped to a physical page in shared memory pool 352 of physical memory 350. Hypervisor memory manager 345 retrieves the requested memory page and returns the page to the requesting shared memory partition. Shared memory partition 3, however, requests a logical memory page 400 which is absent from the shared memory pool 352, and results in a hypervisor page fault 401 being generated. As noted, generation of the hypervisor page fault is transparent to the shared memory partition 3, with shared memory partition 3 being placed into a wait state by the hypervisor memory manager 345 in order to allow the hypervisor memory manager to retrieve the requested logical memory page from the external paging devices.

Figure 5:
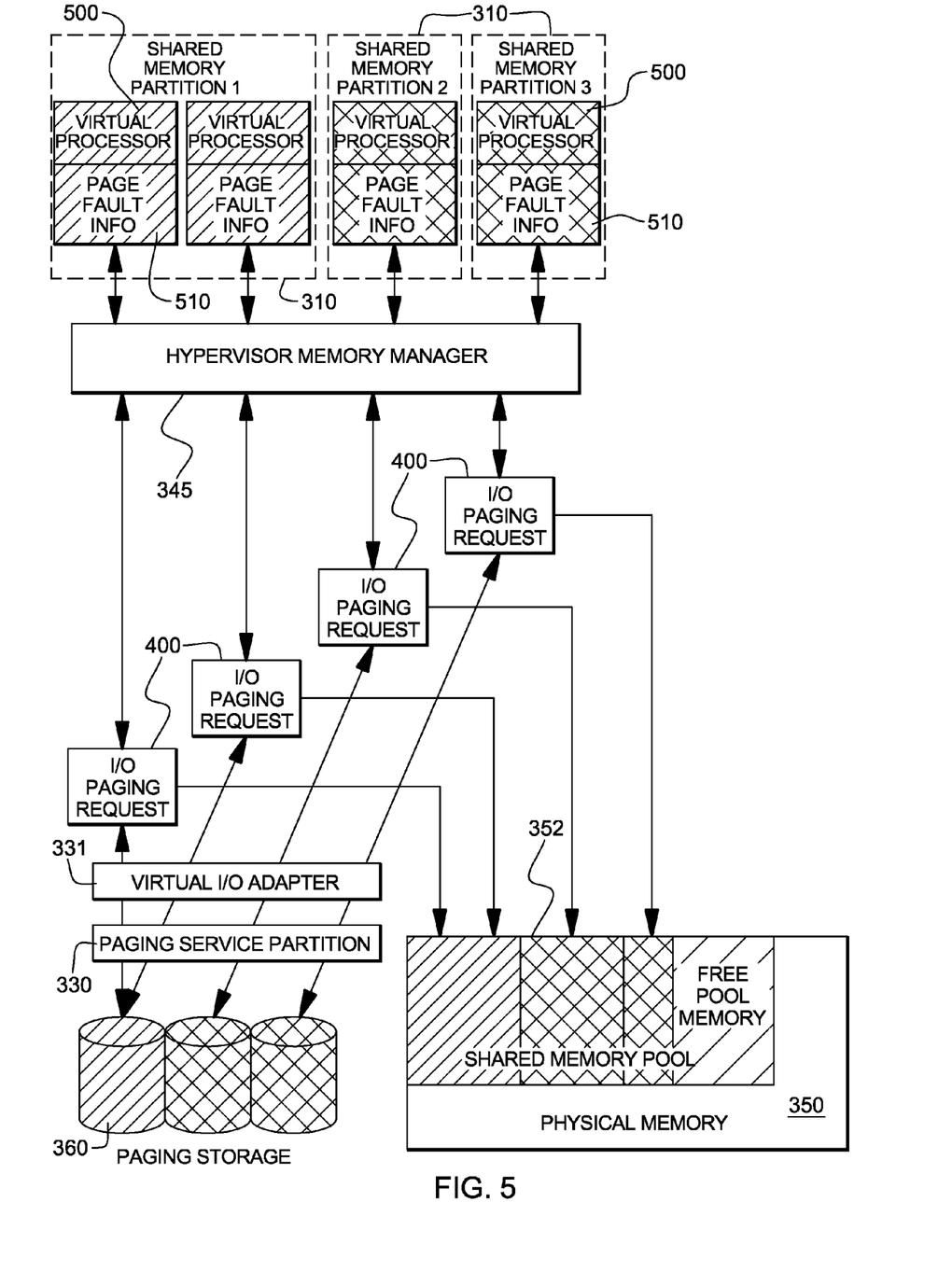
FIG. 5 illustrates one embodiment of an approach for handling hypervisor page faults within a shared memory partition data processing system, such as depicted in FIGS. 3 & 4, in accordance with an aspect of the present invention.

FIG. 5 illustrates one operational embodiment of handling hypervisor page faults within a shared memory partition data processing system such as described above in connection with FIGS. 3 & 4. In this embodiment, three shared memory partitions 310, i.e., shared memory partition 1, shared memory partition 2 & shared memory partition 3, are illustrated, each comprising one or more virtual processors 500, and each encountering a hypervisor page fault 510. Each hypervisor page fault is responsive to a request by a virtual processor 500 for a logical memory page that is not resident in the shared memory pool 352 of physical memory 350. Responsive to each fault, hypervisor memory manager 345 allocates an I/O paging request 400 and forwards, via virtual I/O adapter 331 and paging service partition 330, the I/O paging request to the external paging storage or device(s) 360 to request the needed page. Concurrent with requesting the needed page, the partition's virtual processor (e.g., the executing partition thread) encountering the hypervisor page fault is placed into a wait state.

FIGS. 6A-6D depict one embodiment of logic for handling a hypervisor page fault transparent to the shared memory partition thread requesting a logical memory page having no physical page mapping.

Figure 6A:
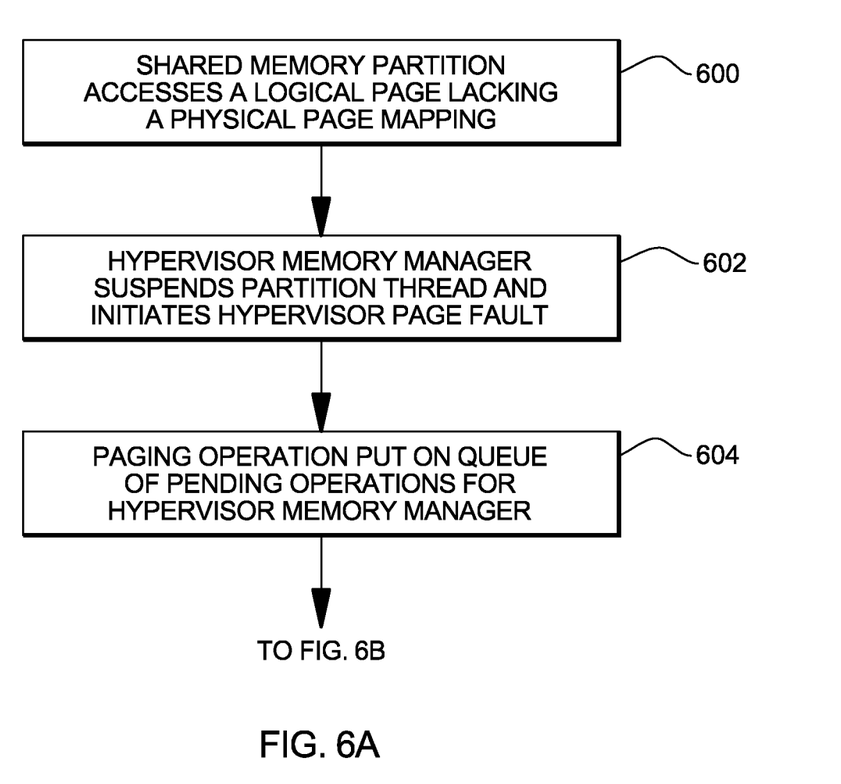
FIGS. 6A-6D depict one embodiment of logic for initiating and satisfying a hypervisor page fault responsive to a shared memory partition's request to access a logical memory page lacking a physical page mapping in the shared memory pool of the physical memory, in accordance with an aspect of the present invention.

Beginning with FIG. 6A, a shared memory partition (or an executing thread of a shared memory partition) requests the hypervisor to access a logical memory page currently lacking a physical page mapping in the shared memory pool of physical memory 600. Responsive to this request to access, the hypervisor memory manager suspends the executing shared memory partition (or partition thread) initiating the request and initiates a hypervisor page fault 602. This hypervisor page fault results in a paging operation being generated, which is placed on a queue in the hypervisor memory manager for pending paging operations to be transferred to the paging service partition 604.

Figure 6B:
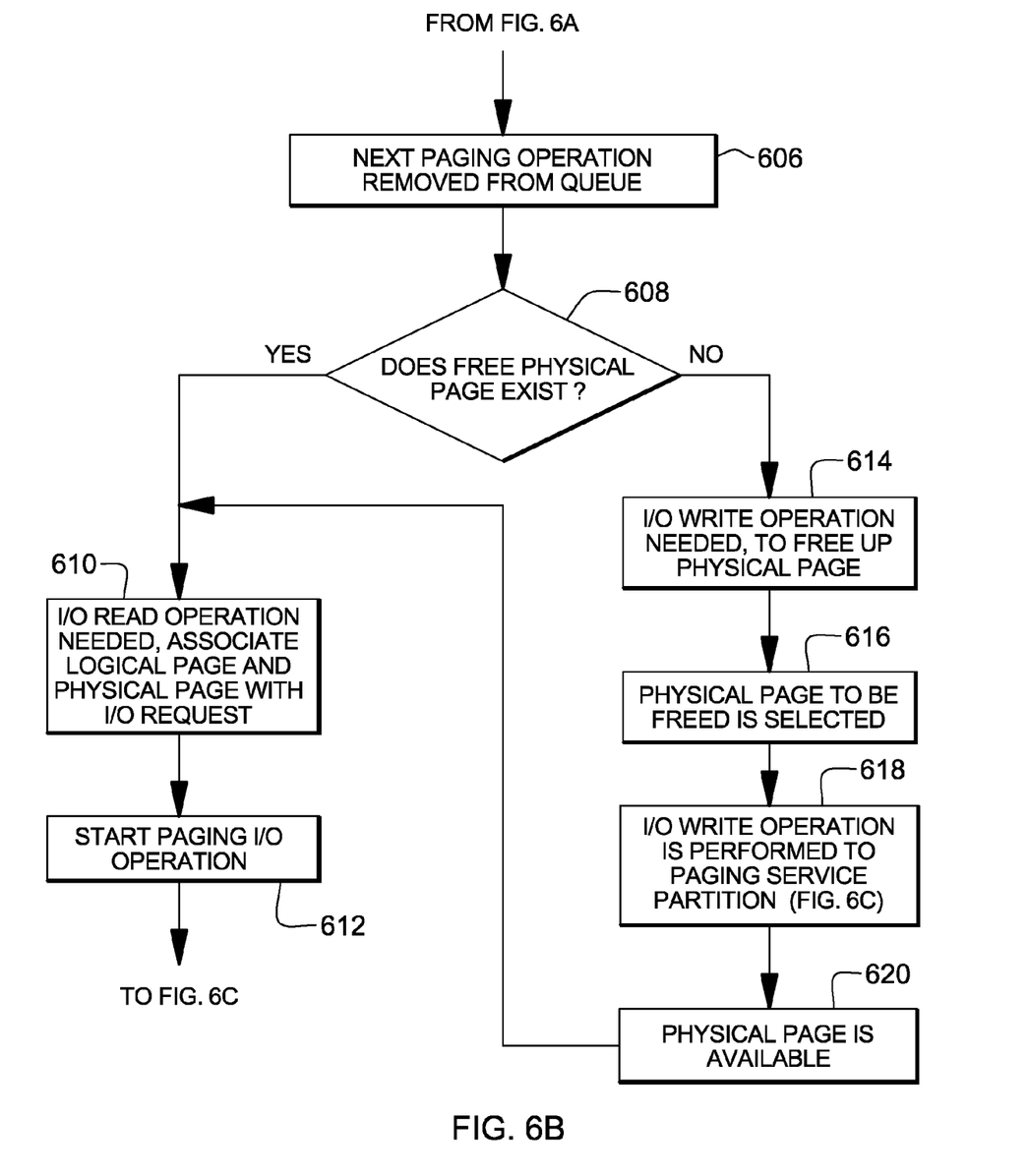

As illustrated in FIG. 6B, a next paging operation is removed from the queue of hypervisor page faults 606 and the hypervisor memory manager determines whether a free physical page exists within the shared memory pool 608. If "yes", then the requested logical memory page and the free physical page are associated with a pending I/O paging request operation 610. The I/O paging request describes the paging operation as a read operation and describes where on external storage the logical memory page contents can be accessed from. The I/O paging request is then submitted to the virtual I/O adapter interfacing the hypervisor and the paging service partition of the data processing system. This starts the paging I/O operation 612, which proceeds as described further below in connection with FIG. 6C.

If no physical page is currently free in the shared memory pool, then an I/O write operation is needed to free up a physical page 614. Essentially, an existing physical page mapping is selected and broken to free up the physical page for use by the hypervisor and the shared memory partition initiating the current paging operation 616. This I/O write operation is performed in a manner similar to that described below in connection with FIG. 6C for the paging I/O read operation, however, instead of reading-in logical memory contents, the logical memory contents are written-out from physical memory to external storage via the paging service partition 618. After completing the I/O write operation, a physical page is available 620 and the I/O read operation, to satisfy the hypervisor page fault, is associated with the freed physical page, along with the requested logical memory page to be retrieved from external storage 610.

Figure 6C:
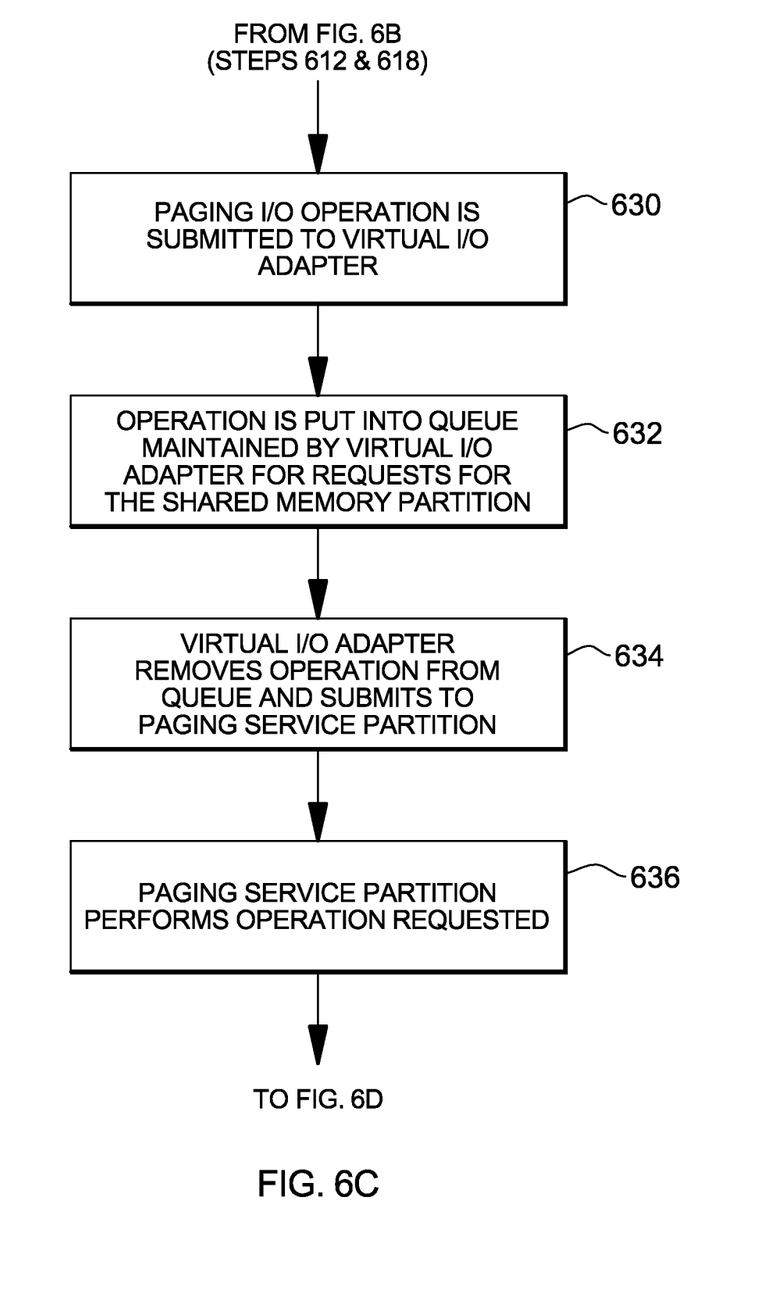

Starting from the paging I/O read operation 612, or the I/O write operation 618 needed to free up a physical page in the logic of FIG. 6B, the logic of FIG. 6C is employed. As illustrated in FIG. 6C, a paging I/O operation is submitted to the virtual I/O adapter interfacing the hypervisor and the paging service partition 630, and this paging I/O operation is placed into a queue maintained by the virtual I/O adapter 632. This queue contains requests for the associated shared memory partition. The virtual I/O adapter removes I/O paging operations from this queue and submits the operations to the paging service partition 634, responsive to which the paging service partition performs the operation requested 636.

Figure 6D:
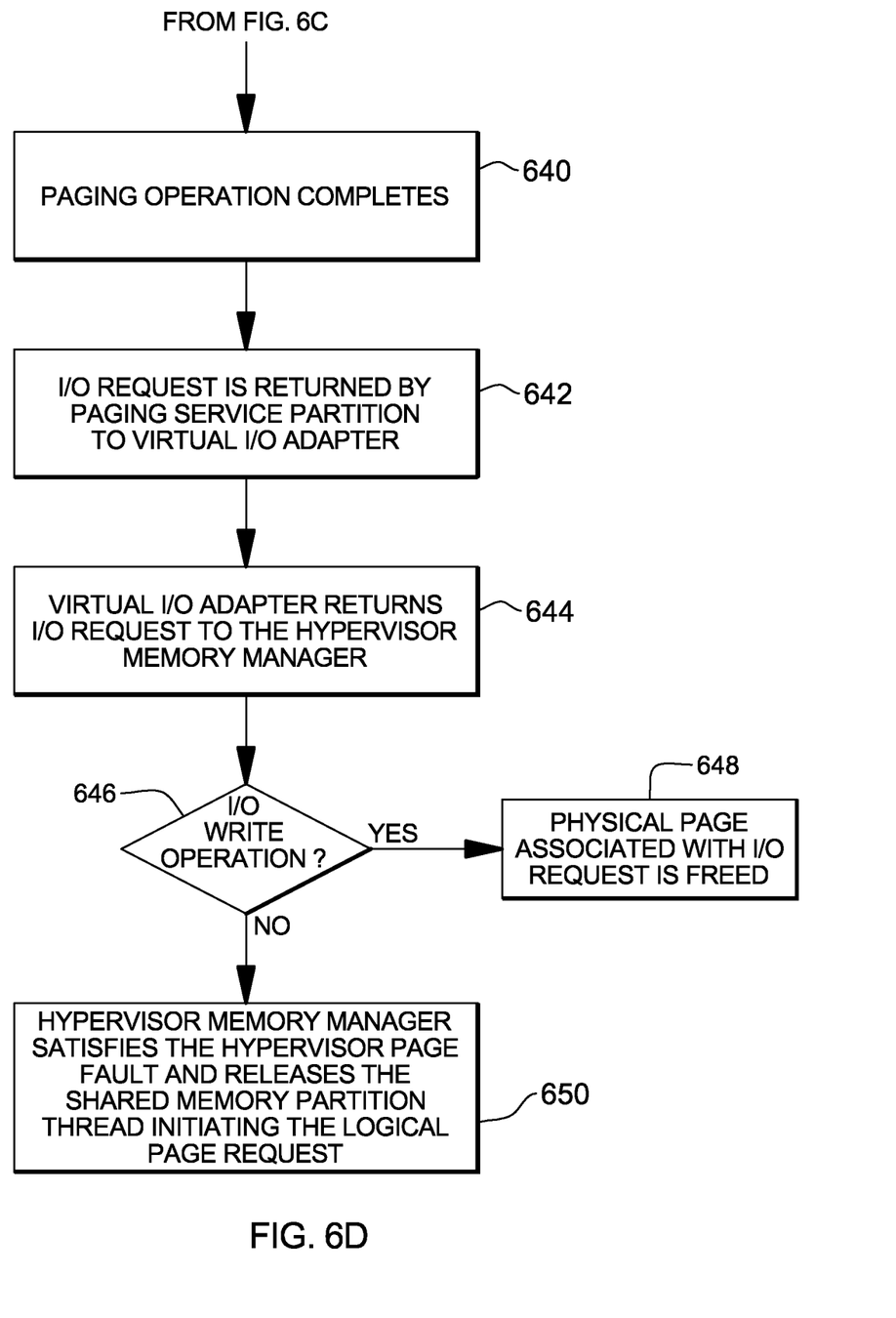

As illustrated in FIG. 6D, once the paging I/O operation is completed 640, the paging service partition notifies the virtual I/O adapter by returning the I/O request with the requested logical memory page to the virtual I/O adapter 642. In turn, the virtual I/O adapter returns the I/O request and logical memory page to the hypervisor memory manager 644. The hypervisor memory manager determines whether the paging operation was an I/O write operation 646 (see 618 in FIG. 6B), and if "yes", then the physical page associated with the I/O request is freed 648, and return is made to block 620 in FIG. 6B. Otherwise, the hypervisor memory manager satisfies the hypervisor page fault and releases the shared memory partition thread initiating the logical page request 646, which completes the paging operation.

In the above-described manner, the hypervisor, or more particularly, the hypervisor memory manger described herein, manages paging operations transparent from the shared memory partition or virtual processor within the shared memory partition initiating a request to access a logical memory page. The approach described above can be extended for multiple shared memory pools, as well as multiple virtual I/O adapters servicing a particular shared memory pool.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402, issued Apr. 24, 2012, as U.S. Pat. No. 8,166,254 B2; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403 416; "Automated Paging Device Management in a Shared Memory Partition Data Processing System", U.S. Ser. No. 12/403,426, issued Mar. 13, 2012, as U.S. Pat. No. 8,135,921 B2; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447, issued Feb. 28, 2012, as U.S. Pat. No. 8,127,086 B2; "Controlled Shut-Down of Partitions Within a Shared Memory Partition Data Processing System", U.S. Ser. No. 12/403,472; and "Managing Migration of a Shared Memory Logical Partition From a Source System to a Target System", U.S. Ser. No. 12/403,485, issued May 1, 2012, as U.S. Pat. No. 8,171, 236 B2.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
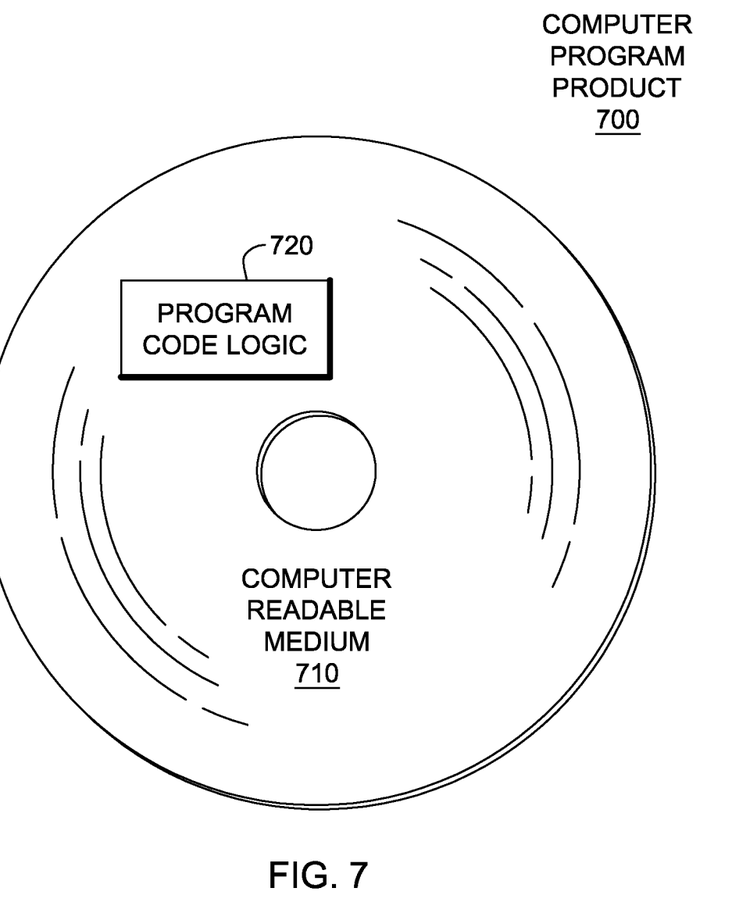
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer-readable media 710 to store computer readable program code means or logic 720 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing access to logical memory pages in a data processing system comprising multiple logical partitions, the method comprising:
providing a shared pool of memory within main physical memory of the data processing system, the shared pool comprising a volume of physical memory with dynamically adjustable sub-volumes associated with different logical partitions of the multiple logical partitions, and comprising logical memory pages thereof mapped to physical memory, wherein the physical memory in the shared pool is overcommitted, with a sum of the logical memory pages assigned to the different logical partitions exceeding an amount of physical memory in the shared pool and at least one logical partition at the multiple logical partitions having an apparent amount of physical memory assigned thereto larger than an actual amount of physical memory assigned thereto;
interfacing the multiple logical partitions and the shared pool via a hypervisor memory manager facility of a hypervisor of the data processing system, the interfacing comprising:
configuring the hypervisor memory manager to manage routine access, by the multiple logical partitions, to logical memory pages within the shared pool; and
configuring the hypervisor manager to manage transparently to the multiple logical partitions, during runtime, page-out of logical memory pages from the shared pool to one or more external paging devices and page-in of logical memory pages from the one or more external paging devices to the shared pool, wherein the page-out and the page-in of logical memory pages for the multiple logical partitions by the hypervisor memory manager during runtime are transparent to the multiple logical partitions, and the amount of physical memory in the shared pool is a set amount of physical memory.

2. The method of claim 1, wherein the interfacing comprises receiving a request at the hypervisor memory manager from an executing logical partition to access a logical memory page thereof lacking a mapping to a physical page in the shared pool, and responsive thereto, suspending by the hypervisor memory manager the executing logical partition initiating the request, and wherein the transparent managing comprises initiating by the hypervisor memory manager an input/output (I/O) paging request to effectuate page-in of the requested logical memory page from the one or more external paging devices to the shared pool.

3. The method of claim 2, wherein the initiating comprises allocating by the hypervisor memory manager the I/O paging request and forwarding the I/O paging request to a paging service partition of the data processing system, the forwarding being via a virtual input/output (VIO) adapter, the VIO adapter interfacing the hypervisor memory manager and the paging service partition, and the paging service partition being coupled to the one or more external paging devices via a physical I/O adapter.

4. The method of claim 3, wherein the paging service partition satisfies the I/O paging request and returns to the hypervisor memory manager the requested logical memory page, wherein the managing comprises storing the requested logical memory page in a mapped physical page of the shared pool associated with the I/O paging request and releasing, by the hypervisor memory manager, the suspended logical partition for continued execution using the requested logical memory page stored in the mapped physical page.

5. The method of claim 2, wherein the transparent managing further comprises determining whether a free physical page exists in the shared pool to accommodate the requested logical memory page once retrieved from the one or more external paging devices, and if so, then associating the requested logical memory page and a physical page of the shared pool with the input/output (I/O) paging request initiated by the hypervisor memory manager.

6. The method of claim 5, wherein if the determining determines that no free physical page exists within the shared pool, then the transparent managing further comprises performing an input/output write operation to free a physical page in the shared pool by moving a logical memory page mapped in the shared memory pool to the one or more external paging devices, and thereafter, associating the requested logical memory page and the freed physical page with the I/O paging request initiated by the hypervisor memory manager.

7. The method of claim 1, wherein the hypervisor memory manager manages page-out of logical memory pages from the shared pool to the one or more external paging devices via a paging service partition of the data processing system and manages page-in of logical memory pages from the one or more external paging devices to the shared pool via the paging service partition, and wherein the hypervisor memory manager interfaces with the paging service partition via a virtual input/output adapter, and the paging service partition interfaces with the one or more external paging devices via a physical input/output adapter.

8. A logically partitioned data processing system comprising:
a shared pool of memory defined within main physical memory of the data processing system, the shared pool comprising a volume of physical memory with dynamically adjustable sub-volumes associated with different logical partitions of multiple logical partitions of the data processing system, and comprising logical memory pages thereof mapped to physical memory, wherein the physical memory in the shared pool is overcommitted, with a sum of the logical memory pages assigned to the different logical partitions exceeding an amount of physical memory in the shared pool and at least one logical partition of the multiple logical partitions having an apparent amount of physical memory assigned thereto larger than an actual amount of physical memory assigned thereto;

a hypervisor comprising a hypervisor memory manager facility interfacing the multiple logical partitions and the shared pool, the hypervisor memory manager:

managing runtime access, by the multiple logical patterns, to logical memory pages within the shared pool; and managing transparent to the multiple logical partitions, during runtime, page-out of logical memory pages from the shared pool to one or more external paging devices and page-in of logical memory pages from the one or more external paging devices to the shared pool, wherein the page-out and the page-in by the hypervisor memory manager for the multiple logical partitions are transparent to the multiple logical partitions, and the amount of physical memory in the shared pool is a set amount of physical memory.

9. The data processing system of claim 8, wherein the hypervisor memory manager receives a request from an executing logical partition thread of the multiple logical partitions to access a logical memory page thereof lacking a mapping to a physical page in the shared pool, and responsive thereto, suspends the executing logical partition thread initiating the request, and initiates an input/output (I/O) paging request to effectuate page-in of the requested logical memory page from the one or more external paging devices to the shared pool.

10. The data processing system of claim 9, wherein the hypervisor memory manager initiates the I/O paging request by allocating the I/O paging request and forwarding the I/O paging request to a paging service partition of the data processing system, wherein the forwarding is via a virtual input/output (VIO) adapter, the VIO adapter interfacing the hypervisor memory manager and the paging service partition, and wherein the paging service partition is coupled to the one or more external paging devices via a physical I/O adapter.

11. The data processing system of claim 10, wherein the paging service partition satisfies the I/O paging request and returns to the hypervisor memory manager the requested logical memory page, the hypervisor memory manager storing the requested logical memory page in a mapped physical page of the shared pool associated with the I/O paging request and releasing the suspended logical partition thread for continued execution using the requested logical memory page stored in the mapped physical page of the shared pool.

12. The data processing system of claim 9, wherein the hypervisor memory manager further determines in response to receiving the request to access a logical memory page lacking a mapping to a physical page in the shared pool whether a free physical page exists in the shared pool to accommodate the requested logical memory page once retrieved from the one or more external paging devices, and if so, then associating the requested logical memory page and a physical page of the shared pool with the I/O paging request initiated by the hypervisor memory manager.

13. The data processing system of claim 12, wherein when the hypervisor memory manager determines that no free physical page exists within the shared pool, the hypervisor memory manager performs an input/output write operation to free a physical page in the shared pool by moving a logical memory page mapped in the shared pool to the one or more external paging devices, and thereafter, associates the requested logical memory page and the freed physical page with the I/O paging request initiated by the hypervisor memory manager to retrieve the requested logical memory page from the one or more external paging devices.

14. The data processing system of claim 8, wherein the hypervisor memory manager manages page-out of logical memory pages from the shared pool to the one or more external paging devices via a paging service partition of the data processing system and manages page-in of logical memory pages from the one or more external paging devices to the shared pool via the paging service partition, and wherein the hypervisor memory manager interfaces with the paging service partition via a virtual input/output (VIO) adapter, and the paging service partition interfaces with the one or more external paging devices via a physical input/output adapter.

15. An article of manufacture comprising:

at least one non-transitory computer-readable storage medium having computer-readable program code logic to manage memory paging in a data processing system comprising multiple logical partitions, the computer-readable program code logic when executing on a processor performing:

defining a shared pool of memory within main physical memory of the data processing system, the shared pool comprising a volume of physical memory with dynamically adjustable sub-volumes associated with different logical partitions of the multiple logical partitions, and comprising logical memory pages thereof mapped to physical memory, wherein the physical memory in the shared pool is overcommitted, with a sum of the logical memory pages assigned to the different logical partitions exceeding an amount of physical memory in the shared pool and at least one logical partition at the multiple logical partitions having an apparent amount of physical memory assigned thereto larger than an actual amount of physical memory assigned thereto;

interfacing the multiple logical partitions and the shared pool via a hypervisor memory manager facility of a hypervisor of the data processing system, the interfacing comprising:

using the hypervisor memory manager to manage routine access, by the multiple logical partitions, to logical memory pages within the shared pool; and using the hypervisor manager to manage transparent to the multiple logical partitions, during runtime, page-out of logical memory pages from the shared pool to one or more external paging devices and page-in of logical memory pages from the one or more external paging devices to the shared pool, wherein the page-out and the page-in of logical memory pages for the multiple logical partitions by the hypervisor memory manager during runtime are transparent to the multiple logical partitions, and the amount of physical memory in the shared pool is a set amount of physical memory.

16. The article of manufacture of claim 15, wherein the interfacing comprises receiving a request at the hypervisor memory manager from an executing logical partition to access a logical memory page thereof lacking a mapping to a physical page in the shared pool, and responsive thereto, suspending by the hypervisor memory manager the executing logical partition initiating the request, and wherein the transparent managing comprises initiating by the hypervisor memory manager an input/output (I/O) paging request to effectuate page-in of the requested logical memory page from the one or more external paging devices to the shared pool.

17. The article of manufacture of claim 16, wherein the initiating comprises allocating by the hypervisor memory manager the I/O paging request and forwarding the I/O paging request to a paging service partition of the data processing system, the forwarding being via a virtual input/output (VIO) adapter, the VIO adapter interfacing the hypervisor memory manager and the paging service partition, and the paging service partition being coupled to the one or more external paging devices via a physical I/O adapter.

18. The article of manufacture of claim 17, wherein the paging service partition satisfies the I/O paging request and returns to the hypervisor memory manager the requested logical memory page, wherein the managing comprises storing the requested logical memory page in a mapped physical page of the shared pool associated with the I/O paging request and releasing, by the hypervisor memory manager, the suspended logical partition for continued execution using the requested logical memory page stored in the mapped physical page.

19. The article of manufacture of claim 16, wherein the transparent managing further comprises determining whether a free physical page exists in the shared pool to accommodate the requested logical memory page once retrieved from the one or more external paging devices, and if so, then associating the requested logical memory page and a physical page of the shared pool with the input/output (I/O) paging request initiated by the hypervisor memory manager.

20. The article of manufacture of claim 19, wherein if the determining determines that no free physical page exists within the shared pool, then the transparent managing further comprises performing an input/output write operation to free a physical page in the shared pool by moving a logical memory page mapped in the shared pool to the one or more external paging devices, and thereafter, associating the requested logical memory page and the freed physical page with the I/O paging request initiated by the hypervisor memory manager.

* * * * *